W. VANDERMAN.
LEAD JOINT RUNNER.
APPLICATION FILED FEB. 23, 1907.
939,356.
Patented Nov. 9, 1909.
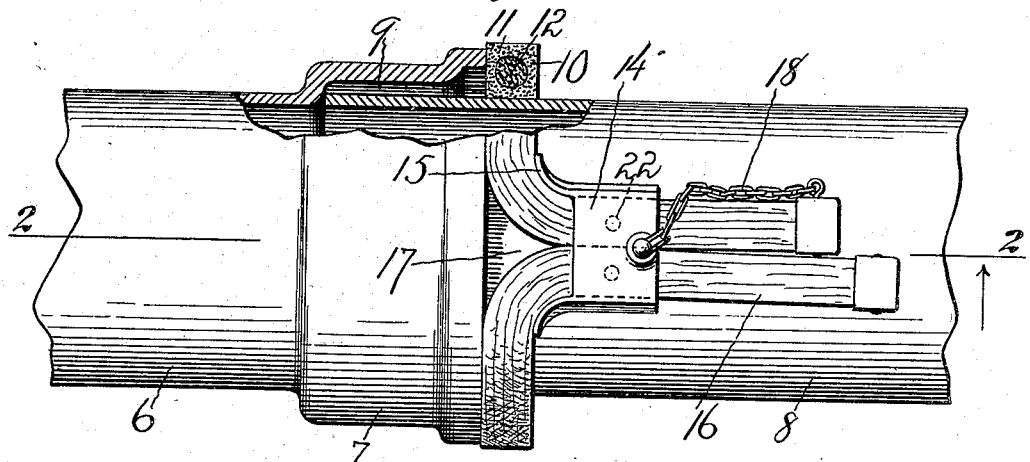
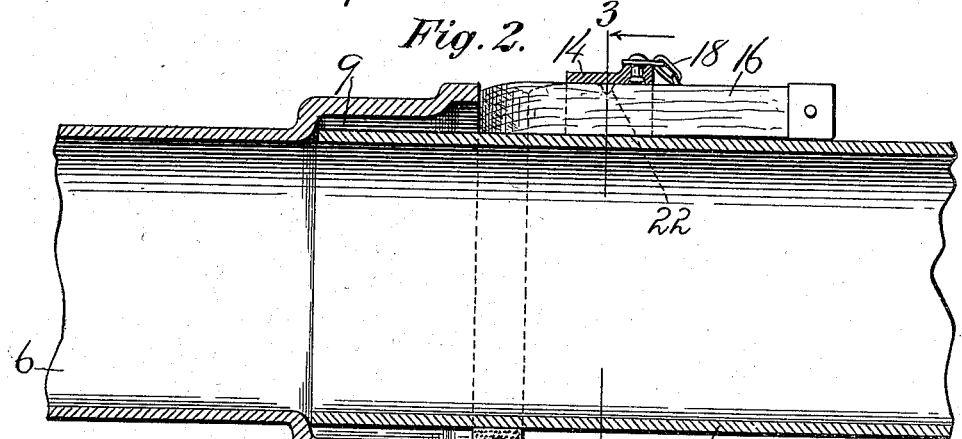
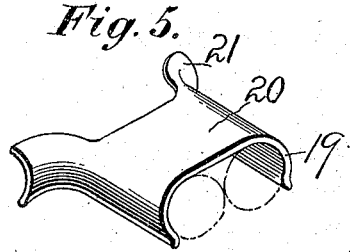
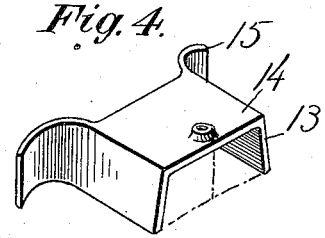
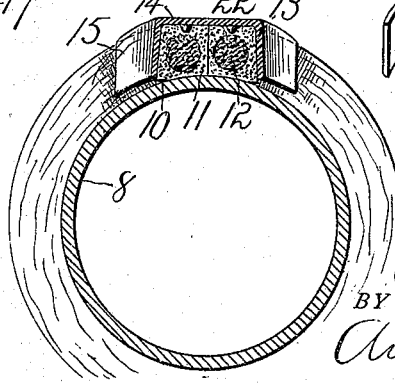
WITNESSES:
Chas. F. Schmel
L. E. Berkovitz
INVENTOR.
William Vanderman
BY
Arthur B. Jenkins,
ATTORNEY.

UNITED STATES PATENT OFFICE.

WILLIAM VANDERMAN, OF WILLIMANTIC, CONNECTICUT.

LEAD-JOINT RUNNER.

939,356.   Specification of Letters Patent.   Patented Nov. 9, 1909.

Application filed February 23, 1907. Serial No. 359,011.

*To all whom it may concern:*

Be it known that I, WILLIAM VANDERMAN, a citizen of the United States, and a resident of Willimantic, in the county of Windham and State of Connecticut, have invented a new and Improved Lead-Joint Runner, of which the following is a specification.

My invention relates to the class of devices used in forming the joint in a soil pipe or the like, and the object of my invention is to provide a device of this class that shall be extremely convenient and effective in use and simple in operation; and a further object of the invention is to provide a device of this class which may be tightly secured in place to effectually close the opening to be filled.

A form of device in the use of which these objects may be attained is illustrated in the accompanying drawings, in which—

Figure 1 is a view of a section of a soil pipe, showing the joint, and with parts cut away to show construction and operation of a device embodying my invention. Fig. 2 is a view in section through the same on the line 2—2 of Fig. 1. Fig. 3 is a view in crosswise section on the line 3—3 of Fig. 2. Fig. 4 is a perspective view of the clamp. Fig. 5 is a perspective view showing a modified form of clamp.

In the accompanying drawings the numeral 6 indicates a section of soil pipe having a hub 7, and the numeral 8 indicates another section, the end of which is secured within the hub 7. In joining the sections of a length of pipe of this construction a chamber 9 is formed within the hub 7 and between the side of the end of the part 8 and the inner wall of said hub. This chamber is usually packed at the bottom or inner part with some fibrous material and the outer portion is then filled with metal, as lead. In thus filling a part of the chamber with the molten metal special means must be provided to close the mouth of the opening to retain the metal in place until it becomes set. In the use of my invention means are provided which will effectually and securely close this opening without danger of release of the parts in the filling operation.

In carrying out the invention I provide a joint runner proper 10. This runner may be of any desirable form in cross-section and of a length considerably greater than the distance around the pipe in order to provide projecting ends.

In the preferred form of construction of the joint runner, and as shown in Figs. 1, 2 and 3, I make it rectangular in shape in cross-section and with the outer portion 11 composed of a flexible, heat resisting material as asbestos, comparatively indestructible by heat, and the inner portion or core 12 is preferably formed of a tougher fibrous material other than asbestos, such as hemp, jute or the like and more susceptible to heat than the outer portion. The outer portion or covering of asbestos thus protects the inner part from heat caused by contact of the molten metal with the runner.

In securing the runner about the section 8 of the pipe I employ a clamp so constructed that the runner is caused to tightly hug that portion of the pipe about which it is placed, and is thus securely held in position and against displacement. The runner is wrapped about the section 8 of the pipe, resting snugly against the edge of the hub 7. This clamp is preferably formed of metal including clamp plates 13 connected by a bridge 14. The plates 13 extend at one end of the structure beyond the bridge 14, and these ends are flared outwardly from each other as at 15, and as clearly shown in Fig. 4 of the drawings.

In placing the device in position the runner is wrapped about the pipe, and the ends 16 are bent at an angle to the part located about the pipe, as shown in Fig. 1, these ends preferably extending along the pipe. The clamp is then placed over the ends and crowded to position, forcing the side parts of the ends tightly together. The clamp is then forced along the runner toward the edge of the hub 7, decreasing the opening 17 between the meeting side surfaces of the ends 16 and the edge of the hub 7. In decreasing this opening the runner is drawn tightly about the end of the section 8 of the pipe, causing it to tightly hug the outer surface of said section and thus effectually prevent it from sliding backward to uncover the mouth of the opening, which it is designed to close. The size of the opening 17 may thus be regulated to adapt it for use with various instruments which may be employed in the filling operation, it being reduced to a minimum so that the entrance to the space between the inner surface of the hub and the outer surface of the section 8 of the pipe is practically closed.

A holder 18, preferably consisting of a flexible connection, may be secured at one end to the clamp and at the other end to the runner, in order to prevent separation of the two parts.

In the form of the device shown in Fig. 5 the clamp is intended for use with a runner round in cross-section. It is practically of the same construction as that shown in Fig. 4, the clamp plates 19 being curved to fit the outer curved surface of the runner, the bridge 20 joining the clamp plates. The flared portions 21 are also curved to fit the curved outer surface of the clamp. The runner formed by the curved plates 19 retains itself against displacement by a movement laterally of the ends of the runner.

From the under side of the bridge projections 22 extend, which, by pressing into the substance forming the runner, will aid in preventing the backward movement of the clamp along the runner.

It will be noted that the flaring foot portions 21, as shown herein, conform somewhat to the circular form of the pipe in cross-section, although I do not desire to necessarily limit myself to this form of construction. By thus forming the outer portion of asbestos and the inner portion or core of a soft fibrous material, the asbestos of the core being tightly joined together, I have provided a runner which is light and extremely durable in the uses to which it is put.

What I claim as my invention and desire to secure by Letters Patent is:—

1. A lead joint runner clamp including clamp plates joined by a bridge, said plates extending beyond the bridge and flaring outward each from the other.

2. A lead joint runner clamp including oppositely disposed clamp plates projecting from a bridge and at an angle thereto, and the bridge uniting said clamp plates and forming an inclosure open at the side opposite the bridge.

3. A lead joint runner clamp including a bridge, side plates projecting from the bridge at an angle thereto, said clamp plates terminating in outwardly flaring foot portions and forming an inclosure open at the side opposite the bridge.

4. A lead joint runner clamp including a bridge, clamp plates projecting at an angle from said bridge and having outwardly flaring foot portions projecting beyond said bridge and forming an inclosure open at the side opposite the bridge.

5. A lead joint runner clamp including a bridge, oppositely disposed clamp plates projecting at an angle from said bridge and flaring outwardly each from the other, said plates terminating in outwardly flaring foot portions and forming an inclosure open at the side opposite the bridge.

6. A lead joint runner including a body part formed of flexible material, a clamp formed of a single piece including side parts arranged to inclose both ends of the runner between them, said side parts being joined by a bridge forming an inclosure open at the side opposite the bridge.

7. A lead joint runner clamp including oppositely disposed side parts rigidly connected and forming an inclosure open on one side to receive and hold a lead joint runner.

WILLIAM VANDERMAN.

Witnesses:
ARTHUR B. JENKINS,
LENA E. BERKOVITCH.